United States Patent
Najmolhoda et al.

(10) Patent No.: US 9,022,346 B2
(45) Date of Patent: May 5, 2015

(54) DIRECT ACTING SOLENOID ACTUATOR

(71) Applicant: Flextronics AP, LLC, Broomfield, CO (US)

(72) Inventors: Hamid Najmolhoda, Grand Rapids, MI (US); Matthew S. Peterson, Broomfield, CO (US)

(73) Assignee: Flextronics AP, LLC, Broomfield, CO (US)

(*) Notice: Subject to any disclaimer, the term of this patent is extended or adjusted under 35 U.S.C. 154(b) by 0 days.

(21) Appl. No.: 13/939,895

(22) Filed: Jul. 11, 2013

(65) Prior Publication Data

US 2014/0014864 A1   Jan. 16, 2014

Related U.S. Application Data

(60) Provisional application No. 61/741,054, filed on Jul. 11, 2012.

(51) Int. Cl.
*F16K 31/12* (2006.01)
*F16K 31/06* (2006.01)
*H01F 7/16* (2006.01)

(52) U.S. Cl.
CPC ............ *F16K 31/06* (2013.01); *F16K 31/0613* (2013.01); *F16C 2322/39* (2013.01); *H01F 2007/163* (2013.01)

(58) Field of Classification Search
USPC ............ 137/596.17, 625.65, 625.64, 625.68; 251/30.01, 129.08, 129.15, 50
See application file for complete search history.

(56) References Cited

U.S. PATENT DOCUMENTS

| | | | |
|---|---|---|---|
| 2,923,582 A | 2/1960 | Dunn | |
| 3,851,285 A | 11/1974 | Rothfuss et al. | |
| 3,856,047 A * | 12/1974 | Takayama | 137/625.61 |
| 4,131,866 A | 12/1978 | Torr | |
| 4,267,897 A | 5/1981 | Takeshima | |
| 4,525,695 A | 6/1985 | Sheng et al. | |
| 4,579,145 A * | 4/1986 | Leiber et al. | 137/625.65 |
| 4,662,605 A * | 5/1987 | Garcia | 251/129.08 |
| 4,774,976 A | 10/1988 | Janecke et al. | |
| 4,905,961 A * | 3/1990 | Ichihashi et al. | 251/129.15 |
| 4,966,195 A | 10/1990 | McCabe | |
| 4,998,559 A * | 3/1991 | McAuliffe, Jr. | 137/596.17 |
| 5,051,631 A * | 9/1991 | Anderson | 310/14 |
| 5,217,047 A | 6/1993 | McCabe | |
| 5,249,603 A | 10/1993 | Byers, Jr. | |
| 5,626,327 A | 5/1997 | Clark | |
| 5,853,028 A * | 12/1998 | Ness et al. | 137/625.65 |
| 6,029,704 A | 2/2000 | Kuroda et al. | |
| 6,313,726 B1 | 11/2001 | Golovatai-Schmidt et al. | |
| 6,397,891 B1 * | 6/2002 | Neuhaus et al. | 137/625.65 |
| 6,435,213 B2 * | 8/2002 | Lou | 137/625.65 |
| 6,901,959 B2 * | 6/2005 | Burrola et al. | 137/625.65 |

(Continued)

FOREIGN PATENT DOCUMENTS

JP    07-151257 A    6/1995

*Primary Examiner* — Matthew W Jellett
(74) *Attorney, Agent, or Firm* — Volpe and Koenig, P.C.

(57) ABSTRACT

A solenoid actuator comprising an armature member that engages a spool including a spool cap on an end of the spool that is axially movable relative to the spool. A bore in the spool allows fluid to flow from a control port to the spool cap, such that pressure is established in the spool cap. The pressure established in the spool cap acts on the spool with a force directly proportional to the control pressure and the fluid-contacting area inside the spool cap.

19 Claims, 4 Drawing Sheets

SECTION A-A

(56) References Cited

U.S. PATENT DOCUMENTS

| | | |
|---|---|---|
| 7,007,925 B2 | 3/2006 | Nordstrom et al. |
| 7,458,561 B2 * | 12/2008 | Oishi ............................ 251/337 |
| 7,766,042 B2 * | 8/2010 | Tabor ....................... 137/625.65 |
| 8,006,719 B2 | 8/2011 | Nordstrom et al. |
| 8,371,331 B2 * | 2/2013 | Najmolhoda et al. ... 137/596.17 |
| 2006/0011878 A1 * | 1/2006 | Denyer et al. ............ 251/129.08 |
| 2007/0138422 A1 | 6/2007 | Najmolhoda et al. |
| 2009/0256091 A1 | 10/2009 | Nordstrom et al. |
| 2013/0104842 A1 | 5/2013 | Weldon et al. |
| 2013/0167950 A1 | 7/2013 | Nomichi et al. |

\* cited by examiner

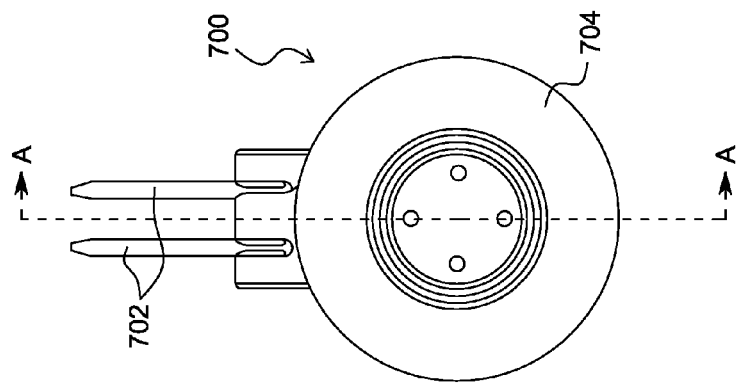
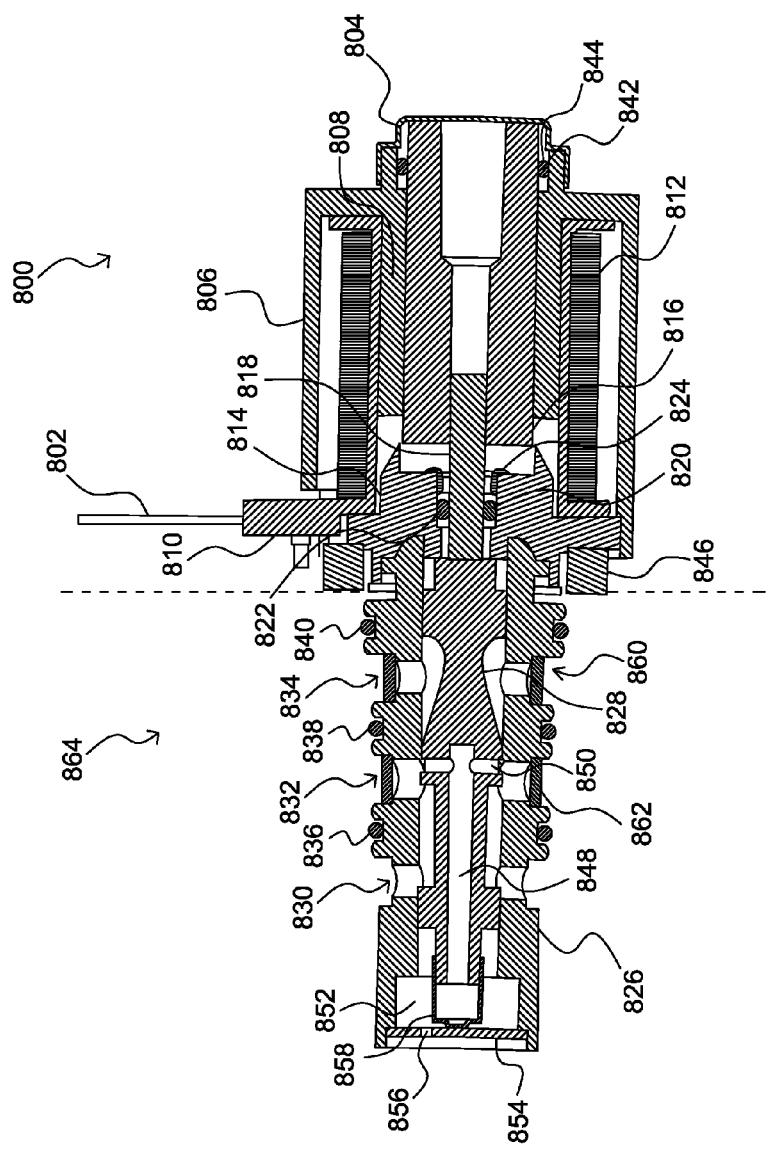

DIRECT ACTING SOLENOID ACTUATOR

CROSS REFERENCE TO RELATED APPLICATION(S)

This application claims the benefit of U.S. Patent Application No. 61/741,054 filed on Jul. 11, 2012, which is incorporated by reference as if fully set forth.

FIELD OF THE INVENTION

The present invention relates to a direct acting electromagnetic solenoid actuator having an armature mechanism that drives a fluid control element.

BACKGROUND OF THE INVENTION

Direct acting solenoid actuators are often used to control fluid pressure in a variety of systems, including clutch mechanisms and other devices in an automobile. Direct acting solenoid actuators employ an armature mechanism that drives a fluid control element, such as a spool, a spring-biased four-way proportional flow control valve, a poppet valve and the like in various hydraulic control applications. Typically, the armature is connected to, and drives, a push pin that engages the fluid control element to this end.

A change in the electrical current supplied to the solenoid results in a change in fluid pressure. Ideally, a given input current corresponds to a single pressure, independent of whether the input current is increasing or decreasing. For example, consider a solenoid that is initially at high pressure (20 bars) at zero current. When a 0.5 Amp current is applied, the pressure drops to 12 bars. Ideally, if the current is increased to 1 Amp, and then decreased back down to 0.5 Amps, the pressure will again be 12 bars. Thus, a pressure value can be determined for each value of the current, independent of whether the current is increasing or decreasing.

In reality, a number of factors contribute to hysteresis in solenoid actuators. Hysteresis describes the difference in output for a given input when the input is increasing versus decreasing. In a direct acting solenoid actuator fluid control valve, friction between the armature and the armature sleeve, or between the spool and the nozzle body surrounding the spool, may prevent the armature and spool from sliding smoothly in response to the induced magnetic field. This may result in different values of pressure for a given current, depending on whether the current is increasing or decreasing. As such, the reliability of the fluid control valve decreases, and the direction of the current (increasing or decreasing) must be taken into account when selecting a current for achieving a desired pressure.

In an effort to improve the reliability of the fluid control valve, the spool and nozzle body may be machined such that the spool fits tightly within the nozzle body, but is still able to move axially in response to the force of the induced magnetic field on the armature. This machining, however, requires a high level of precision. Further, any variation in the spool design may require a corresponding change in the nozzle body.

Thus, there is a need for direct acting solenoid actuators that reduce or minimize hysteresis during operation without requiring additional high-precision machining.

SUMMARY OF THE INVENTION

A solenoid actuator comprising an armature member that engages a spool including a spool cap on an end of the spool that is axially movable relative to the spool. A bore in the spool allows fluid to flow from a control port to the spool cap, such that pressure is established in the spool cap. The pressure established in the spool cap acts on the spool with a force directly proportional to the control pressure and the fluid-contacting area inside the spool cap.

BRIEF DESCRIPTION OF THE DRAWINGS

FIG. 7 is an elevation view of a fluid control valve having a direct acting solenoid actuator for driving a spool having a floating feedback piston in linear fashion pursuant to another embodiment of the invention.

FIG. 8 is a longitudinal cross-sectional view taken along line A-A of FIG. 7.

DETAILED DESCRIPTION OF THE INVENTION

Figure 1:
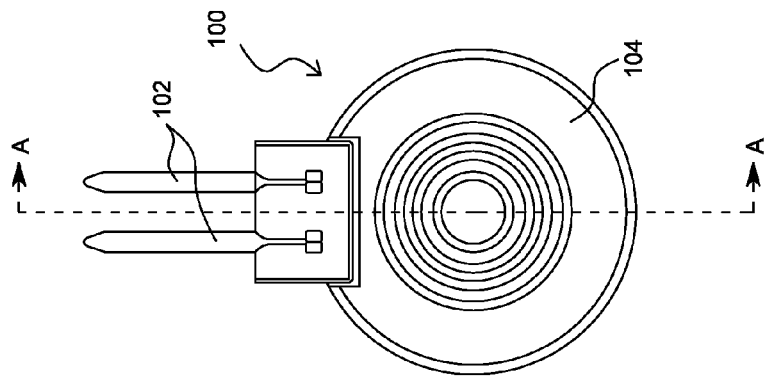
FIG. 1 is an elevation view of a fluid control valve having a direct acting solenoid actuator for driving a spool having a floating feedback piston in linear fashion pursuant to an illustrative embodiment of the invention.
Figure 2:
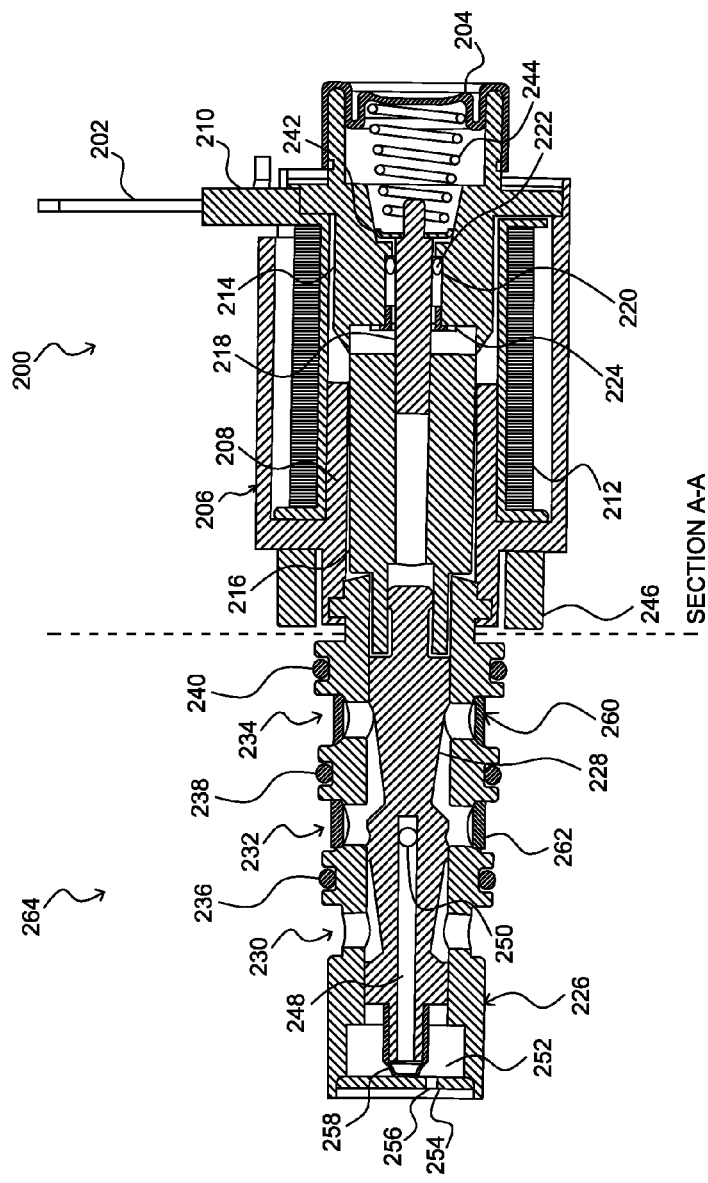
FIG. 2 is a longitudinal cross-sectional view taken along line A-A of FIG. 1.

Referring to FIG. 1, a direct acting solenoid actuator 100 is shown having electrical terminals 102 and a calibration cap 104. A longitudinal cross-sectional view taken along line A-A of FIG. 1 is shown in FIG. 2.

A fluid control valve 264 has a direct acting solenoid actuator 200 pursuant to an illustrative embodiment of the invention. The direct acting solenoid actuator 200 drives a spool 228 within a nozzle body 226 of the fluid control valve 264. In one embodiment of the invention, the spool 228 includes a spool cap (floating feedback piston) 258. The direct acting solenoid actuator 200 comprises a housing 206 containing a bobbin 210, a coil 212 of wire wound on the bobbin 210 and connected to electrical terminals 202. In one embodiment, the housing 206 comprises steel and the bobbin 210 is a synthetic material such as plastic, although those in the art would realize that other materials may be used. The coil 212 is contained between the outer part of the housing 206 and a flux sleeve 208. A pole piece 214 is fixedly mounted on the end of the housing 206 with an armature stop 224 fixedly disposed in the inner bore of the pole piece 214. A spacer 246 is provided on the end wall of the housing 206 to position the fluid control valve 264.

As will be described hereinafter, a fully floating cage 220 of radial bearings 222 is disposed in the inner bore of the pole piece 214, with the radial bearings 222 riding on the inner surface of the pole piece 214 and also riding on the outer surface of the push pin 218 (armature push member) associated with the armature 216. The cage 220 is fully floating in the annular space between the pole piece 214 and the push pin 218 in that the cage 220 is not fixed in any plane and can move freely axially and radially in the annular space between the illustrated integral shoulder on the inner bore of the pole piece 214 and the armature stop 224. This permits the movement of the armature 216 to be axially aligned relative to the pole piece 214 and the flux sleeve 208. The push pin 218 is press fit or otherwise connected to the armature 216, which is received in the flux sleeve 208 of the housing 206 such that the armature 216 and push pin 218 together move axially in response to current applied to the coil 212.

Figure 3:
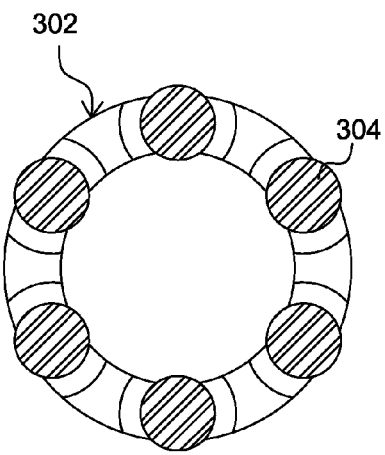
FIG. 3 shows a sectional view of the cage of rolling elements pursuant to an illustrative embodiment.

Referring to FIG. 3, a cage 302 of radial bearings 304 is shown. The cage 302 may have a variety of shapes, not limited to that shown. The ratio of the diameter of the cage 302 with respect to the diameter of the radial bearings 304 may also be varied. The diameter of the cage 302 may be determined based on a particular direct acting solenoid actuator. For example, the cage 302 may be sized such that the radial bearings 304 ride on the inner surface of the pole piece 214 in FIG. 2 and also ride on the outer surface of the push pin 218. The cage 302 may be "thin" with respect to the diameter of the radial bearings 304, thereby exposing a greater portion of the radial bearings 304, or may surround the radial bearings 304 almost completely. In either case, a portion of the radial bearings 304 may be exposed, and may extend beyond the inner and outer diameter of the cage 302. The cage 302 may house six radial bearings 304, as shown FIG. 3, or may have greater or fewer radial bearings 304.

Figure 4:
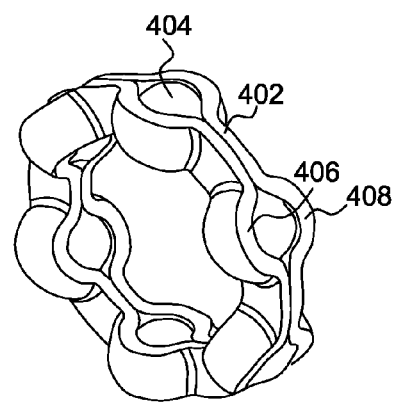
FIG. 4 shows a perspective view of the cage of rolling elements of FIG. 3.

FIG. 4 shows a perspective view of the cage 302 of radial bearings 304 shown in FIG. 3. Referring to FIG. 4, the cage 402 may comprise a top piece 406 and a bottom piece 408. The top piece 406 and bottom piece 408 may be solid, covering the top and bottom of each radial bearing 404, or may be open, such that a portion of the top and bottom of the radial bearings 404, as well as the sides, are exposed. Alternatively, the cage 402 may comprise a single piece. The radial bearings 404 may be free to rotate in all directions within the cage 402. Of course, those of skill in the art would realize that the function of the top and bottom pieces 406, 408 is to hold the radial bearings 404 in position relative to each other, although some amount of flexibility in the top and bottom pieces 406, 408 may be permitted.

Figure 5:
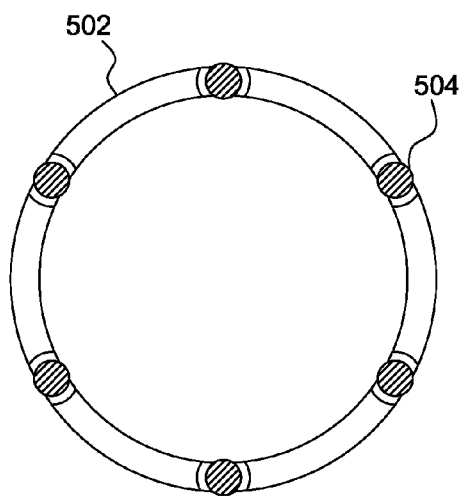
FIG. 5 shows a sectional view of the cage of rolling elements having different radial bearing diameters pursuant to another illustrative embodiment.
Figure 6:
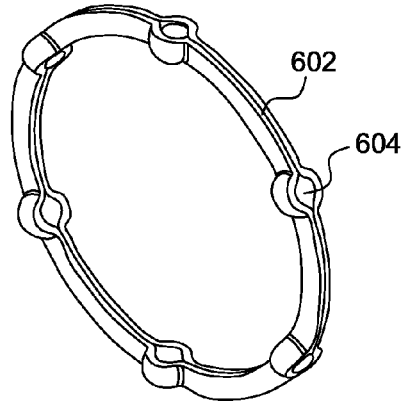
FIG. 6 shows a perspective view of the cage of FIG. 5 for the radial bearings.

FIG. 5 shows another embodiment of a cage 502 of radial bearings 504. The cage 502 in this embodiment has a larger diameter with respect to the diameter of the radial bearings 504. FIG. 6 shows a side view of the cage 602 of radial bearings 604.

In a conventional solenoid actuator, the armature push member is received with a tight fit into the pole piece. Referring back to FIG. 2, this would correspond to the push pin 218 being in full contact with the pole piece 214, or in sliding contact with a bushing (not shown) which is received with a tight fit into the pole piece 214. Changes in current applied to the coil 212 result in movement of the armature 216 and push pin 218, causing the outer surface of the push pin 218 to slide against the inner surface of the pole piece 214 or bushing. If fluid carrying contaminants were to enter the area between the push pin 218 and the pole piece 214 or bushing, the contaminants may become lodged between the push pin 218 and the pole piece 214 or bushing, greatly increasing the friction between them, and altering the response of the fluid control valve 264 to a given applied current. This altered response contributes to hysteresis, reducing the reliability and/or repeatability of the fluid control valve 264 response to a particular current. Depending on the size and quantity of the contaminants, the performance of the fluid control valve 264 may degrade to the point of failure. If the area between the push pin 218 and the pole piece 214 were increased, the armature 216 and push pin 218 may become misaligned with the flux sleeve 208 and pole piece 214, increasing the friction between the surfaces, and degrading the fluid control valve response.

In contrast, referring back to FIG. 2, the present invention comprises a cage 220 of radial bearings 222 that is positioned between the push pin 218 and the pole piece 214. The cage 220 of radial bearings 222 allows for a space between the pole piece 214 and the push pin 218. In the event that fluid carrying contaminants enters the space between the pole piece 214 and the push pin 218, the likelihood that contaminants will become lodged between the push pin 218 and the pole piece 214 is greatly reduced due to the larger space. The solenoid is thus less susceptible to damage caused by contaminants in the fluid. The cage 220 of radial bearings 222 also serves to guide the axial motion of the push pin 218, meanwhile reducing friction between the pole piece 214 and the push pin 218. Instead of the pole piece 214 being in full contact with the push pin 218, the pole piece 214 and push pin 218 are each now only in contact with the radial bearings 222. These radial bearings 222 are free to move within the cage 220, and thus allow the push pin 218 to move within the pole piece 214 with minimal resistance. It should be noted that although only one cage 220 is shown the particular location, several cages 220 may be utilized, and in different locations.

The reduced diameter end of the armature 216 is received with tight supporting fit on the adjacent end of the spool 228. The nozzle body 226 includes supply port 234 defined between O-ring seals 238 and 240 and protected by filter 260; control port 232 defined between O-ring seals 236 and 238 and protected by filter 262; exhaust port 230; and end exhaust opening 256 in the nozzle cap 254. The spool 228 is moved in response to movement of the armature 216 to regulate pressure at the control port 232.

The outer end of the push pin 218, and thus the armature 216, is biased by a spring mechanism 244. FIG. 2 shows a conical coil spring, though other types of spring mechanisms may be used. The spring mechanism 244 is confined between a spring cap 242 and a calibration cap 204 that may be deformed to adjust spring preload that establishes the high pressure state of the control valve (shown in FIG. 2 at 0 Amps; no current to coil 212). Thus, at 0 Amps, the supply port 234 is open to the control port 232, defining the high pressure state. As the current applied to the coil 212 increases, the armature 216 and thus the spool 228 are displaced toward the spring mechanism 244, resulting in a narrowing of the hydraulic pathway between the supply port 234 and the control port 232. This causes the control pressure and thereby the hydraulic force to drop accordingly.

Pursuant to an embodiment of the invention, the spool 228 includes a spool cap (floating feedback piston) 258 that communicates to a longitudinal spool bore 248 and radial spool bore 250 that is open to the control port 232 as shown in FIG. 2. The exterior of the spool cap 258 is exposed to exhaust or zero pressure in chamber 252, while the interior of the spool cap 258 is exposed to control pressure as just described. Accordingly, the spool cap 258 is axially and independently movable relative to the spool 228, and the pressure contained in the spool cap 258 acts on the spool 228 with a force that is directly proportional to the control pressure and the fluid-contacting area inside the spool cap 258. The spool cap 258 in effect acts as a vessel to retain this pressure. This hydraulic force balances out the magnetic force on the armature 216 as well as the force due to the spring mechanism 244.

In the absence of a spool cap 258, if pressure feedback is desired, then the end of the nozzle body 226 must be stepped down to receive the end of the spool 228 with a tight supporting fit. The fit must be tight enough that fluid does not seep between the nozzle body 226 and the spool 228, but still loose enough for the spool 228 to move axially within the nozzle body 226. This creates challenges in the machining of the spool 228 and the nozzle body 226, requiring not only that they be machined with high precision and small tolerance for error, but also that they both be concentric to each other and themselves. If the fit is too loose, fluid may seep into the exhaust chamber 252, reducing the pressure in the bore 248 and thereby reducing the force on the spool 228 opposing the magnetic force on the armature 216. If the fit is too tight, friction between the outside of the end of the spool 228 and the inside of the nozzle body 226 may interfere with the axial motion of the spool 228, altering the response of the fluid control valve 264 to a change in the current applied to the coil 212.

Alternatively, a large space may result in fluid carrying contaminants seeping between the end of the spool 228 and nozzle body 226. The contaminants in the fluid may become lodged between the spool 228 and the nozzle body 226, increasing the friction between them, and inhibiting the motion of the spool 228.

In the present application, the spool cap 258 provides pressure feedback without requiring that the end of the spool 228 fight tightly within the end of the nozzle body 226 and eliminates the need for tight concentricity controls. Instead, the nozzle body 226 may end in a wide exhaust chamber 252, while the spool cap 258 fits tightly around the end of the spool 228. In a preferred embodiment, the spool cap 258 may be made of drawn brass or stainless steel, though other materials may be used. The spool cap 258 will be forced or moved axially against or abutting the nozzle cap 254 due to the hydraulic control pressure therein and will remain stationary, while the spool 228 moves to regulate control pressure as commanded. The spool cap 258 thus eliminates the need for the spool 228 and nozzle body 226 to have stepped diameters between each other. Instead, the spool cap, which has a relatively straight-forward design, may be fashioned to fit around the end of the spool 228. This simplifies the machining of the fluid control value.

An additional advantage of the spool cap 258 is that the force on the spool 228 due to the feedback pressure may be adjusted without altering the design of the nozzle body 226. As described above, the interior of the spool cap 258 is exposed to control pressure so that the pressure contained in the spool cap 258 acts on the spool 228 with a force that is directly proportional to the control pressure and the fluid-contacting area inside the spool cap 258. If a greater feedback force is desired, the fluid-contacting area inside the spool cap 258 may be increased. This may be accomplished by increasing the diameter of the end of the spool 228, but may not require a change in the nozzle body 226, since the exhaust chamber 252 shown in FIG. 2 may accommodate a wider end of the spool 228 and spool cap 258. Accordingly, the spool cap 258 presented herein allows for the feedback pressure to be adjusted without requiring that the nozzle body 226 be altered. This means that spools having different end diameters and therefore feedback pressures may be used with a single nozzle body 226.

Referring to FIG. 7, a direct acting solenoid actuator 700 is shown having electrical terminals 702 and an armature end cap 704. A longitudinal cross-sectional view taken along line A-A of FIG. 7 is shown in FIG. 8. A fluid control valve 864 has a direct acting solenoid actuator 800 pursuant to another illustrative embodiment of the invention. The direct acting solenoid actuator 800 drives a spool 828 within a nozzle body 826 of the fluid control valve 864. In one embodiment of the invention, the spool 828 includes a spool cap (floating feedback piston) 858. The direct acting solenoid actuator 800 comprises a housing 806 containing a bobbin 810, a coil 812 of wire wound on the bobbin 810 and connected to electrical terminals 802. The coil 812 is contained between the outer part of the housing 806 and a flux sleeve 808. A pole piece 814 is fixedly mounted on the end of the housing 806 with an armature stop 824 fixedly disposed in the inner bore of the pole piece 814. A spacer 846 is provided on the end wall of the housing 806 to position the fluid control valve 864.

A first fully floating cage 820 of radial bearings 822 is disposed in the inner bore of the pole piece 814, with the radial bearings 822 riding on the inner surface of the pole piece 814 and also riding on an outer surface of the push pin 818 associated with the armature 816. The cage 820 is fully floating in the annular space between the pole piece 814 and the push pin 818 in that the cage 820 is not fixed in any plane and can move freely axially and radially in the annular space between the illustrated integral shoulder on the inner bore of the pole piece 814 and the armature stop 824. The push pin 818 is press fit or otherwise connected to armature 816, which is received in the flux sleeve 808 of the housing 806, such that the armature 816 and push pin 818 move axially in response to current applied to the coil 812.

The outer end surface of the armature 816 is also received in a second fully floating cage 844 of radial bearings 842 residing in armature end cap 804, which is fixed to the housing 806 with the radial bearings 842 riding on the outer end surface of the armature 816. The second cage 844 is fully floating as described above in the annular space between the end of the housing 806 and the armature end cap 804.

The normally low and normally high pressure states of the control valve shown in FIG. 8 are established by externally commanded control current signals provided to the coil 812. An optional spring (not shown) may be disposed between the nozzle cap 854 and the spool cap 858 if a calibration feature is desired.

The inner end of the push pin 818 engages the adjacent end of the spool 828. The nozzle body 826 includes a supply port 834 between O-ring seals 838 and 840 and protected by filter 860; control port 832 between O-ring seals 836 and 838 and protected by filter 862; exhaust port 830; and exhaust opening 856 in nozzle cap 854. The spool 828 is moved in response to movement of the armature 816 to regulate pressure at the control port 832.

In one embodiment of the invention, the spool 828 includes a spool cap (floating feedback piston) 858 that communicates to a longitudinal spool bore 848 and radial spool bores 850 to the control port 832 as shown in FIG. 8. The exterior of the spool cap 858 is exposed to exhaust or zero pressure in chamber 852, while the interior of the spool cap 858 is communicated to control pressure as described via bores 848, 850 so that the pressure contained in the spool cap 858 acts on the spool 828 with a force that is directly proportional to the pressure and area inside the spool cap 858. This hydraulic force balances out the magnetic force on the armature 816. The spool cap 858 will be forced or moved axially against and abutting the nozzle cap 854 due to the hydraulic control pressure therein and will remain stationary, while the spool 828 moves to regulate control pressure as commanded.

Figure 9:
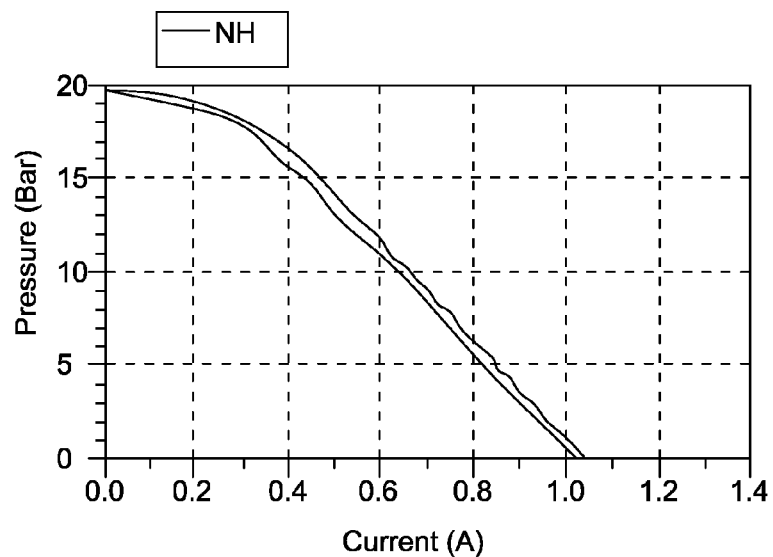
FIG. 9 shows normally high pressure versus current achievable by the fluid control valve of FIGS. 1, 2; 3, 4; and 5, 6.

FIG. 9 shows a hysteresis plot achievable by a normally high pressure at zero (0) coil current fluid control valve in FIGS. 1 and 2, described above. The two curves represent two current sweeps, in one case increasing current from 0 Amps to about 1 Amp (current in Amps on the horizontal axis), and in the other case decreasing current from about 1 Amp to 0

Amps. The minimal difference in pressure for a given current reflects the device's reduced friction and robustness to contaminants.

Figure 10:
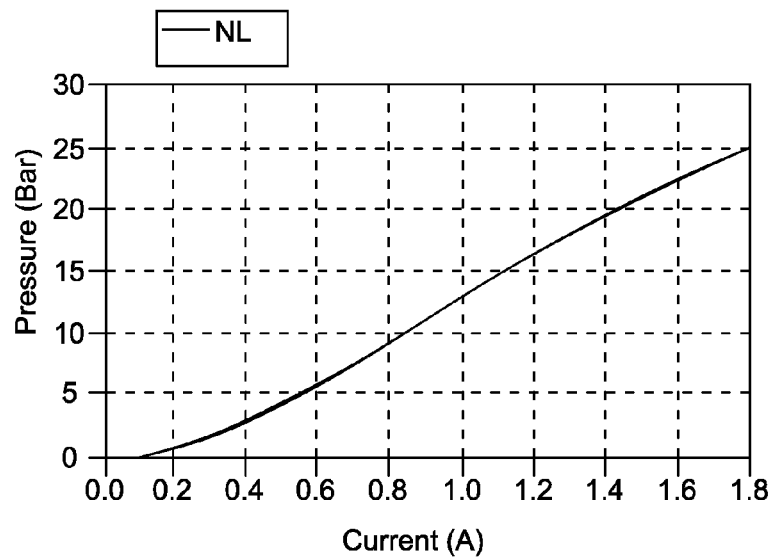
FIG. 10 shows normal low pressure versus current for the fluid control valve of FIGS. 7, 8; 3, 4; and 5, 6.

FIG. 10 shows a hysteresis plot achievable by a normally low pressure at zero (0) coil current fluid control valve such as the valve in FIGS. 7 and 8, described above. Like the previous plot, this plot reflects two current sweeps, one in which current in increasing, and one in which it is decreasing. In this case the hysteresis is sufficiently minimized that the two curves are indistinguishable.

Although certain illustrative and/or preferred embodiments of the direct acting actuator and associated fluid control valves have been shown and described in detail, it should be understood that variations or modifications may be made without departing from the spirit or scope of the present invention.

What is claimed is:

1. A solenoid actuator fluid control valve comprising:
   a solenoid actuator component having:
      a fixed solenoid component; and
      a movable armature component; and
   a fluid control valve component having:
      a fixed nozzle body;
      a movable spool within the fixed nozzle body; and
      a spool end cap disposed over a first end of the moveable spool and between the first end of the moveable spool and the fixed nozzle body to provide a feedback pressure;
      wherein the spool end cap is axially movable relative to the movable spool; and
      wherein an exterior of the spool cap is exposed to exhaust or zero pressure and an interior of the spool cap is exposed to control pressure.

2. The solenoid actuator fluid control valve of claim 1 wherein the movable armature component is coupled to the movable spool.

3. The solenoid actuator fluid control valve of claim 1 wherein the fixed nozzle body has at least one control port, and wherein a bore in the movable spool allows fluid to flow from the at least one control port to the spool end cap.

4. The solenoid actuator fluid control valve of claim 3 wherein the fluid in the spool end cap establishes the feedback pressure in the spool end cap.

5. The solenoid actuator fluid control valve of claim 4 wherein the feedback pressure established in the spool end cap causes the spool end cap to move axially until it abuts an end of the fixed nozzle body.

6. The solenoid actuator fluid control valve of claim 4 wherein the feedback pressure established in the spool end cap acts on the movable spool with a motive feedback force in a first axial direction.

7. The solenoid actuator fluid control valve of claim 6 wherein a pressure is established at the control port, and wherein the motive feedback force is directly proportional to the pressure established at the control port.

8. The solenoid actuator fluid control valve of claim 6 wherein the spool end cap has an axial fluid contacting area, and wherein the motive feedback force is directly proportional to the axial fluid contacting area.

9. The solenoid actuator fluid control valve of claim 6 wherein a motive magnetic force acts on the movable armature component in a second axial direction, and wherein the motive feedback force substantially balances out the motive magnetic force.

10. The solenoid actuator fluid control valve of claim 6 wherein the solenoid actuator component further comprises a spring mechanism, and wherein the spring mechanism acts on the movable armature component with a motive spring force in a second axial direction.

11. The solenoid actuator fluid control valve of claim 10 wherein the motive feedback force substantially balances the motive spring force.

12. The solenoid actuator fluid control valve of claim 1 wherein the diameter of an inner surface of an end of the fixed nozzle body is wider than the diameter of an outer surface of an end the movable spool.

13. The solenoid actuator fluid control valve of claim 12 further comprising a radial space between the inner surface of the end of the fixed nozzle body and the outer surface of the movable spool.

14. The solenoid actuator fluid control valve of claim 1 wherein the diameter of an inner surface of an end of the fixed nozzle body is wider than the diameter of an outer surface of the spool end cap.

15. The solenoid actuator fluid control valve of claim 1 wherein the spool end cap is concentric to the first end of the movable spool.

16. The solenoid actuator fluid control valve of claim 1 wherein the fixed nozzle body comprises an exhaust chamber at an end of the fixed nozzle body.

17. The solenoid actuator fluid control valve of claim 16 wherein an axial end of the exhaust chamber comprises an end exhaust opening.

18. The solenoid actuator fluid control valve of claim 17 wherein the end exhaust opening allows fluid to flow out of the exhaust chamber.

19. A method of operation of a fluid control valve comprising:
   in a fluid control valve component having:
      a fixed nozzle body;
      a movable spool within the fixed nozzle body; and
      a spool end cap within the fixed nozzle body disposed over a first end of the moveable spool and axially movable relative to the movable spool;
      wherein an exterior of the spool cap is exposed to exhaust or zero pressure and an interior of the spool cap is exposed to control pressure;
   adjusting a diameter of the spool end cap to selectively adjust a feedback pressure on the movable spool.

* * * * *